UNITED STATES PATENT OFFICE.

CARL LUDWIG MÜLLER, OF LUDWIGSHAFEN-ON-THE-RHINE, BAVARIA, GERMANY, ASSIGNOR TO THE BADISCHE ANILIN AND SODA FABRIK, OF MANNHEIM, GERMANY.

MANUFACTURE OF SULPHONATED PURPLE DYE-STUFFS FROM BASIC ROSANILINE.

SPECIFICATION forming part of Letters Patent No. 353,265, dated November 23, 1886.

Application filed September 25, 1886. Serial No. 214,548. (Specimens.)

*To all whom it may concern:*

Be it known that I, CARL LUDWIG MÜLLER, a subject of the King of Bavaria, residing at Ludwigshafen-on-the-Rhine, in the Kingdom of Bavaria and Empire of Germany, have invented new and useful Improvements in the Manufacture of a Sulphonated Purple Dye-Stuff or Coloring-Matter from the Basic Rosaniline Derivative Resulting from the Condensation of Tetraethyldiamidobenzophenone with Benzyldiphenylamine, of which the following is a specification.

This invention relates to the manufacture of a sulphonated purple dye-stuff or coloring-matter from the basic rosaniline derivative resulting from the condensation of tetraethyldiamidobenzophenone with benzyldiphenylamine.

In carrying out my invention, I take about ten parts, by weight, of tetraethyldiamidobenzophenone, and mix the same intimately with eight parts, by weight, of benzyldiphenylamine and one part, by weight, of toluol. I then quickly add four parts, by weight, of oxychloride of phosphorus. The mixture thus produced is then heated under constant agitation until its inside temperature has reached 100° centigrade, at which temperature it is to be kept during the space of about from six to eight hours. The bronze-colored "melt" thus obtained is boiled with about two hundred parts of water, with the addition of as much hydrochloric acid as will be found necessary for rendering the coloring-matter soluble. The resulting acid solution is filtered, diluted with its own volume of water, and the free hydrochloric acid contained in the same is partly neutralized with acetate of soda, and then a solution of common salt is added in sufficient quantity to precipitate the dye-stuff. The resulting precipitate is filtered, pressed, and dried.

In order to convert the basic rosaniline derivative thus produced (and which, according to its chemical composition, may be called a "tetraethyl-benzylphenyl-pararosaniline") into my new sulphonated coloring-matter possessing acid properties, and therefore capable of dyeing in an acid bath, the known methods of sulphonization may be employed. Practical results are obtained by treating the said basic coloring-matter with fuming sulphuric acid at a temperature requiring to be regulated according to the strength of the sulphuric acid employed. The action of rectified sulphuric acid produces inferior results on account of its requiring the assistance of a temperature exceeding 100° centigrade, and thus liable of injuring the coloring-matter, while fuming sulphuric acid effects the desired sulphonization at a considerably lower temperature and even without any external application of heat.

As an example, I proceed as follows: About two parts, by weight, of the basic rosaniline derivative (produced, as before described, by the condensation of tetraethyldiamidobenzophenone with benzyldiphenylamine) are added in the cold in the state of a dry powder, and under constant agitation in very small portions at a time, to about nine parts, by weight, of fuming sulphuric acid containing about twenty-three per centum of free sulphuric anhydride. The acid mixture is externally surrounded with ice, and care is taken to prevent any rise of its temperature beyond 10° centigrade. The solution thus obtained, after being first allowed to stand at a temperature of about from 15° to 20° centigrade during the space of about twelve hours, is afterward carefully diluted with about thirty times its own volume of ice-cold water, and the precipitate of the free sulpho-acid thus produced is then dissolved on the water bath with a slight excess of caustic-soda liquor, and the alkaline solution, after being filtered and carefully neutralized with muriatic acid, is precipitated with common salt. The flocculent precipitate thus obtained is then filtered, pressed, and dried.

The sulphonated dye-stuff or coloring-matter produced in the usual mercantile form of a sodium salt, as before described, presents the following characteristics. It has the appearance of a dark-blue powder possessing a bronze-like luster, easily soluble in water with a bright bluish purple color. By the addition of caustic alkalies the said purple color of the aqueous solution becomes gradually destroyed; but it is restored upon neutralizing the free alkali with a mineral or organic acid. Rectified sulphuric acid dissolves the dye-stuff with a yellow-red color, which upon the addition of water turns blue, a dark-blue precipitate of the free sulpho-acid being formed at the same time. Strong hydrochloric acid produces a red-brown solution. By submitting an intimate mixture of the dye-stuff with caustic lime to destructive distillation a basic oil distils over, possessing a characteristic disagreeable smell, and partly insoluble in dilute hydrochloric acid, the insoluble portion of the same developing a blue color in the presence of nitric acid.

The new dye-stuff, if employed in the processes of dyeing and printing in a similar manner as the hitherto known sulphonated coloring-matters, is capable of imparting to animal fiber a bright bluish-purple color, resisting the action of acids. The above-described chemical properties of my new sulphonated dye-stuff are similar to those of its lower homologue produced in an analogous manner from tetramethyldiamidobenzophenone and benzyldiphenylamine, and which coloring-matter forms the subject-matter of separate application for Letters Patent by myself jointly with Henry Bull. From the said lower homologue it may, however, be easily distinguished by the considerably bluer shade which it produces in dyeing and printing.

What I claim as new, and desire to secure by Letters Patent, is—

As a new product, the purple dye-stuff or coloring-matter herein described, and having the characteristics set forth.

In testimony whereof I have hereunto set my hand in the presence of two subscribing witnesses.

CARL LUDWIG MÜLLER.

Witnesses:
HENRY SCHAEPPI,
J. F. MONAGHAN.